(12) United States Patent
Hirakata

(10) Patent No.: US 11,012,021 B2
(45) Date of Patent: May 18, 2021

(54) INVERTER DEVICE AND CONTROL CIRCUIT THEREFOR, AND MOTOR DRIVING SYSTEM

(71) Applicant: FUJI ELECTRIC CO., LTD., Kanagawa (JP)

(72) Inventor: Masaki Hirakata, Tokyo (JP)

(73) Assignee: FUJI ELECTRIC CO., LTD., Kawasaki (JP)

(*) Notice: Subject to any disclaimer, the term of this patent is extended or adjusted under 35 U.S.C. 154(b) by 0 days.

(21) Appl. No.: 16/797,184

(22) Filed: Feb. 21, 2020

(65) Prior Publication Data

US 2020/0195186 A1 Jun. 18, 2020

Related U.S. Application Data

(63) Continuation of application No. PCT/JP2018/034194, filed on Sep. 14, 2018.

(51) Int. Cl.
| | |
|---|---|
| H02P 27/06 | (2006.01) |
| H02P 29/02 | (2016.01) |
| H02M 7/5387 | (2007.01) |

(52) U.S. Cl.
CPC ........ H02P 27/06 (2013.01); H02M 7/53871 (2013.01); H02P 29/02 (2013.01)

(58) Field of Classification Search
CPC ..... H02M 1/32; H02M 7/53871; H02P 27/06; H02P 29/028; H02P 29/02; H02P 29/024
See application file for complete search history.

(56) References Cited

U.S. PATENT DOCUMENTS

| | | | |
|---|---|---|---|
| 6,239,566 B1 | 5/2001 | Tareilus et al. | |
| 8,884,577 B2 * | 11/2014 | Tsuji | H02M 1/32 318/801 |

(Continued)

FOREIGN PATENT DOCUMENTS

| | | |
|---|---|---|
| JP | 2000-014184 | 1/2000 |
| JP | 2008-236994 | 10/2008 |

(Continued)

OTHER PUBLICATIONS

International Search Report dated Nov. 13, 2018 with respect to PCT/JP2018/034194.

(Continued)

Primary Examiner — Thai T Dinh
(74) Attorney, Agent, or Firm — IPUSA, PLLC

(57) ABSTRACT

An inverter device includes gate driving circuits for upper and lower arms of a bridge circuit, a first power supply supplying a power supply voltage to each driving circuit, and a second power supply having a reference potential different from that of the first power supply. The inverter device also includes a first fail-safe circuit having a reference potential common to the first power supply and generating driving commands with respect to the upper and lower arms, and a second fail-safe circuit having a reference potential common to the second power supply and generating driving commands with respect to the upper or lower arm. The lower arm gate driving circuit has two driving command input functions having different reference potentials, one function inputs the driving commands from the first fail-safe circuit, and the other function inputs the driving commands from the second fail-safe circuit.

13 Claims, 10 Drawing Sheets

(56) References Cited

U.S. PATENT DOCUMENTS

| | | | | |
|---|---|---|---|---|
| 9,112,344 B2* | 8/2015 | Fukuta | ..................... | H02H 7/16 |
| 9,948,219 B2* | 4/2018 | Saha | ....................... | B60L 58/20 |
| 2013/0264985 A1* | 10/2013 | Hargis | .................... | H02M 1/32 |
| | | | | 318/400.42 |
| 2015/0155816 A1 | 6/2015 | Saito et al. | | |
| 2018/0331616 A1 | 11/2018 | Hirakata et al. | | |

FOREIGN PATENT DOCUMENTS

| | | |
|---|---|---|
| JP | 2011-259517 | 12/2011 |
| WO | 2014/010061 | 1/2014 |
| WO | 2018/030381 | 2/2018 |

OTHER PUBLICATIONS

Written Opinion of the International Searching Authority dated Nov. 13, 2018 with respect to PCT/JP2018/034194.

\* cited by examiner

US 11,012,021 B2

INVERTER DEVICE AND CONTROL CIRCUIT THEREFOR, AND MOTOR DRIVING SYSTEM

CROSS-REFERENCE TO RELATED APPLICATIONS

This application is a continuation application of International Application No. PCT/JP2018/034194 filed on Sep. 14, 2018 and designated the U.S., the entire contents of which are incorporated herein by reference.

BACKGROUND OF THE INVENTION

1. Field of the Invention

Embodiments discussed herein are related to an inverter device having a fail-safe function and a control circuit therefor, and a motor driving system provided with this inverter device.

2. Description of the Related Art

In a motor driving system that drives, by an inverter device, a motor of a hybrid automobile or the like, it is known to operate a fail-safe circuit when some kind of trouble occurs in a component that forms the system, and in case of an emergency such as a vehicle collision or the like. This fail-safe circuit short-circuits windings of the motor by operating a semiconductor switching element of an inverter main circuit, or discharges a capacitor connected between positive and negative DC bus-bars, for example, and a high reliability is required of this fail-safe circuit to continuously protect the system from damage, and to secure safety of passengers.

In this type of motor driving system, a low power supply (hereinafter also referred to as a first power supply) of 12 [V], for example, is generally provided to an inverter control circuit that includes the fail-safe circuit, as an auxiliary power supply. The inverter control circuit includes a CPU (Central Processing Unit) for motor control, a current sensor of the motor, and the like.

When a loss of the above-mentioned first power supply occurs due to a failure or the like, the power supply to the fail-safe circuit is cut off to make the fail-safe circuit inoperable, and thus, as a measure against the fail-safe circuit becoming inoperable, Japanese Laid-Open Patent Publication No. 2000-14184 (paragraphs [0028]-[0035], FIG. 1, etc.), for example, describes a technique that uses a redundant structure for providing the power supply to the inverter control circuit that includes the fail-safe circuit.

FIG. 11 is a circuit diagram of a motor driving system described in Japanese Laid-Open Patent Publication No. 2000-14184. The motor driving system illustrated in FIG. 11 includes a 400 [V] main battery (hereinafter also referred to as a second power supply) 51, an isolated DC-DC converter 52, an operation state detection device 53, a first power supply 54, an inverter control circuit 60 including a fail-safe circuit, a switching element 61 for discharging a capacitor 63 connected to a DC bus-bar, a bridge circuit 62 formed by semiconductor switching elements 62a through 62f, and a three-phase motor M.

According to this conventional technique, the voltage of the first power supply 54, and a voltage obtained by isolation and step-down of the voltage of the second power supply 51 by the DC-DC converter 52 (both voltages are 12 [V]) are provided to the inverter control circuit 60 under an OR condition. By using such a redundant structure for providing the power supply to the fail-safe circuit within the inverter control circuit 60, the reliability of a fail-safe operation (short-circuiting the windings of the motor M by turning on the switching elements 62a through 62c of an upper arm or the switching elements 62d through 62f of a lower arm, discharging the capacitor 63 by turning on the switching element 61, or the like) in case of emergency is improved.

In the motor driving system using the redundant structure for providing the power supply, as illustrated in FIG. 1i, a case where the fail-safe operation is performed by short-circuiting the windings of the motor M will further be described. As an example, a winding short-circuiting process for a case of a loss of the first power supply 54 is as follows.

First, the loss of the first power supply 54 is detected by the fail-safe circuit within the inverter control circuit 60, and gate signals, that turn on the switching elements of all phases of the upper arm or the lower arm, are generated. Because a reference potential of the first power supply 54 and the inverter control circuit 60 (fail-safe circuit) is a body potential of the vehicle, and a reference potential of the switching elements of the bridge circuit 62 is a potential of the second power supply 51, signals and power supplies spanning these potentials need to be isolated.

In other words, in the fail-safe circuit using the reference potential that is the body potential, gate signals generated by a gate driving circuit having an isolation function based on an output voltage of the DC-DC converter 52, are supplied to the switching elements 62a through 62c or 62d through 62f using the reference potential that is a high potential.

Next, FIG. 12 is a circuit diagram of the inverter device and the motor driving system, using the redundant structure for providing the power supply to the fail-safe circuit, based on a principle similar to that of FIG. 11, and power supply providing paths are indicated by bold lines.

The inverter device and the motor driving system illustrated in FIG. 12 include a high-voltage main battery 1, a main switch 2, a capacitor (second power supply) 3 connected between positive and negative DC bus-bars, a three-phase bridge circuit 4 formed by semiconductor switching elements 4a through 4f, and a motor PM, such as a permanent magnet synchronous motor.

In addition, a control device that generates gate signals of the switching elements 4a through 4f, is provided with a first power supply 6 that is a low-voltage auxiliary power supply, an isolated power supply circuit 11 having isolation and step-down functions of a transformer, and an inverter control circuit 13.

The inverter control circuit 13 is provided with a CPU 7 for motor control, a fail-safe circuit 8 that is controlled by this CPU 7 and generates gate driving commands with respect to gate driving circuits 12a through 12f which will be described later, isolated power supply circuits 9a, 9b, and 9c for an upper arm and an isolated power supply circuit 10 for a lower arm, provided with power supply voltages from the first power supply 6 and the isolated power supply circuit 11, gate driving circuits 12a, 12b, and 12c that generate gate signals of the switching elements 4a, 4b, and 4c of the upper arm, and gate driving circuits 12d, 12e, and 12f that generate gate signals of the switching elements 4d, 4e, and 4f of the lower arm.

As may be clearly seen from FIG. 12, the power supply to the fail-safe circuit 8, the isolated power supply circuits 9a, 9b, and 9c for the upper arm, and the isolated power supply circuit 10 for the lower arm, is provided using a redundant structure by the isolated power supply circuit 11 that is connected to the first power supply 6 and the second power supply 3, and as a result, the power supply to all of the gate driving circuits 12a through 12f is provided using the redundant structure.

In FIG. 12, a reference potential of a circuit part on the "low-voltage side" is an anode potential of the first power supply 6, and a reference potential of a circuit part on the "high-voltage side" is an anode potential of the second power supply 3 (anode potential of a DC bus-bar). In other words, the isolated power supply circuits 9a, 9b, and 9c for the upper arm, the isolated power supply circuit 10 for the lower arm, and the gate driving circuits 12a through 1f respectively use two reference potentials, and the power supply voltage using the anode potential of the first power supply 6 as the reference potential, and the power supply voltage using the anode potential of the second power supply 3 as the reference potential, are provided to the gate driving circuits 12a through 12f.

The isolated power supply circuit 11 illustrated in FIG. 12 provides the power supply to a large number of circuits, such as the fail-safe circuit 8 provided on the low-voltage side, the gate driving circuits 12a through 12f, the isolated power supply circuits 9a, 9b, and 9c for the upper arm, the isolated power supply circuit 10 for the lower arm, and the like. Further, in recent years, the gate driving circuits 12a through 12f of this type are being formed into ICs to enhance integrated functions thereof, including a signal isolation function, a self-diagnostic function, a temperature detection function and various protection functions of the switching elements, a communication function, and the like, and a current consumption of the IC itself is increasing.

For the above described reasons, a current supply duty of the isolated power supply circuit 11 is increasing, and combined with a need to provide isolation between an input and an output by a transformer, there is a tendency for a size of the isolated power supply circuit 11 to increase. As a result, there is a problem in that the size reduction of the inverter device and the entire motor driving system becomes limited.

When the motor windings are short-circuited by a fail-safe operation, whether to select turning on the switching elements of all phases of the upper arm, or the switching elements of all phases of the lower arm, depends of whether the switching elements of all phases of the selected arm can be turned on. For example, when the switching element of one of the phases of the upper arm is short-circuited, or the switching element of one of the phases of the lower arm is open-circuited, as a failure event, the motor windings are short-circuited by turning on the switching elements of all phases of the upper arm, because the switching elements of all phases of the upper arm can be turned on.

When only a failure caused by the loss of the first power supply is considered in a state where the power supply of the gate driving circuit uses the redundant structure formed by the first power supply and the second power supply, the windings may be short-circuited using the second power supply, by turning on the switching elements of all phases of the upper arm or the lower arm. Accordingly, from a viewpoint of securing the fail-safe operation with respect to the failure caused by the loss of the first power supply, it is not always necessary to provide the power supply using the redundant structure with respect to both the switching elements of all phases of the upper arm and the switching elements of all phases of the lower arm, and it is sufficient to provide the power supply using the redundant structure with respect to one of the arms.

Depending on the failure event, a situation may occur in which one of the upper arm and the lower arm, having the switching elements of all phases that can be turned on, would have to be selected, however, a possibility of such a failure event and the failure caused by the loss of the first power supply occurring simultaneously is extremely small. For example, when the failure caused by the loss of the first power supply is not generated, the power is supplied from the first power supply to both the upper arm and the lower arm, and the fail-safe operation can be performed by short-circuiting the windings, by selecting the arm having the switching elements of all phases that can be turned on and turning on the switching elements of all phases.

Accordingly, embodiments disclosed herein were conceived to avoid the excessive duties of the isolated power supply circuit 11 and the like forming a power supply generation means, because it is inefficient to provide the power supply of the gate driving circuit using the redundant structure for the upper arm and the lower arm, as illustrated in FIG. 12.

SUMMARY OF THE INVENTION

Accordingly, it is an object in aspects of the embodiments to provide an inverter device and a control circuit therefor, and a motor driving system, which can reduce a capacity of the power supply generation means, reduce the overall size of the device, and reduce the cost, without providing a power supply using an excessively redundant structure for the purposes of securing the fail-safe function.

In order to achieve the above described object, a control circuit for an inverter device that is configured to drive a motor by performing an AC-DC conversion by a bridge circuit including a plurality of switching elements coupled between DC bus-bars, according to a first aspect of the embodiments, includes an upper arm driving circuit configured to generate driving signals of upper arm switching elements among the plurality of switching elements included in the bridge circuit; a lower arm driving circuit configured to generate driving signals of lower arm switching elements among the plurality of switching elements included in the bridge circuit; a first power supply configured to supply a power supply voltage to the upper arm driving circuit and the lower arm driving circuit; a second power supply, having a reference potential different from that of the first power supply, and configured to supply a power supply voltage from the DC bus-bars to the upper arm driving circuit or the lower arm driving circuit; a first fail-safe circuit, having a reference potential common to that of the first power supply, and configured to generate driving commands with respect to the upper arm driving circuit and the lower arm driving circuit; and a second fail-safe circuit, having a reference potential common to that of the second power supply, and configured to generate driving commands with respect to the upper arm driving circuit or the lower arm driving circuit, wherein the upper arm driving circuit or the lower arm driving circuit has two driving command input functions having different reference potentials, wherein one of the two driving command input functions is an input function to input the driving commands output from the first fail-safe circuit, and the other of the two driving command input functions is an input function to input the driving commands output from the second fail-safe circuit, and wherein the first fail-safe circuit and the second-fail safe circuit provide a fail-safe function that turns on the upper arm switching elements of all phases or the lower arm switching elements of all phases in the bridge circuit, to short-circuit windings of the motor.

An inverter device for driving a motor by performing an AC-DC conversion by a bridge circuit including a plurality of switching elements coupled between DC bus-bars, according to a second aspect of the embodiments, includes an upper arm driving circuit configured to generate driving signals of upper arm switching elements among the plurality of switching elements included in the bridge circuit; a lower arm driving circuit configured to generate driving signals of lower arm switching elements among the plurality of switching elements included in the bridge circuit; a first power supply configured to supply a power supply voltage to the upper arm driving circuit and the lower arm driving circuit; a second power supply, having a reference potential different from that of the first power supply, and configured to supply a power supply voltage from the DC bus-bars to the lower arm driving circuit; a first fail-safe circuit, having an anode potential of the first power supply as a reference potential, and configured to generate driving commands with respect to the upper arm driving circuit and the lower arm driving circuit; and a second fail-safe circuit, having an anode potential of the second power supply as a reference potential, and configured to generate driving commands with respect to the lower arm driving circuit, wherein the lower arm driving circuit has two driving command input functions having different reference potentials, wherein one of the two driving command input functions is an input function to input the driving commands output from the first fail-safe circuit, and the other of the two driving command input functions is an input function to input the driving commands output from the second fail-safe circuit, and wherein the first fail-safe circuit and the second fail-safe circuit provide a fail-safe function that turns on the upper arm switching elements of all phases or the lower arm switching elements of all phases in the bridge circuit, to short-circuit windings of the motor.

In the inverter device according to a third aspect of the embodiments, the second fail-safe circuit according to the second aspect outputs driving commands that turn on the lower arm switching elements of all phases when an output voltage of a lower arm isolated power supply circuit supplied with the first power supply is lower than a first threshold value, and outputs driving commands that turn off the lower arm switching elements of all phases when the output voltage of the lower arm isolated power supply circuit is higher than the first threshold value.

In the inverter device according to a fourth aspect of the embodiments, the lower arm driving circuit according to the second or third aspect prioritizes input of the driving commands output from the second fail-safe circuit to turn on the lower arm switching elements of all phases when an output voltage of a lower arm isolated power supply circuit supplied with the first power supply is lower than a first threshold value, and prioritizes input of the driving commands output from the first fail-safe circuit when the output voltage of the lower arm isolated power supply circuit is higher than the first threshold value to generate the driving signals of the lower arm switching elements.

In the inverter device according to a fifth aspect of the embodiments, the inverter device according to the second aspect further includes a voltage detection means for detecting a voltage between the DC bus-bars, wherein the second fail-safe circuit outputs the driving commands that turn off the lower arm switching elements of all phases when a voltage detection value of the voltage detection means is lower than a second threshold value, and outputs the driving commands that turn on the lower arm switching elements of all phases when the voltage detection value of the voltage detection means is higher than the second threshold value and an output voltage of a lower arm isolated power supply circuit supplied with the first power supply is lower than a first threshold value.

An inverter device for driving a motor by performing an AC-DC conversion by a bridge circuit including a plurality of switching elements coupled between DC bus-bars, according to a sixth aspect of the embodiments includes an upper arm driving circuit configured to generate driving signals of upper arm switching elements among the plurality of switching elements included in the bridge circuit; a lower arm driving circuit configured to generate driving signals of lower arm switching elements among the plurality of switching elements included in the bridge circuit; a first power supply configured to supply a power supply voltage to the upper arm driving circuit and the lower arm driving circuit; a second power supply, having a reference potential different from that of the first power supply, and configured to supply a power supply voltage from the DC bus-bars to the upper arm driving circuit; a first fail-safe circuit, having an anode potential of the first power supply as a reference potential, and configured to generate driving commands with respect to the upper arm driving circuit and the lower arm driving circuit; and a second fail-safe circuit, having a potential of an output terminal of the upper arm switching element of one of the phases as a reference potential, and configured to generate driving commands with respect to the upper arm driving circuit, wherein the upper arm driving circuit has two driving command input functions having different reference potentials, wherein one of the two driving command input functions is an input function to input the driving commands output from the first fail-safe circuit, and the other of the two driving command input functions is an input function to input the driving commands output from the second fail-safe circuit, and wherein the first fail-safe circuit and the second fail-safe circuit provide a fail-safe function that turns on the upper arm switching elements of all phases or the lower arm switching elements of all phases in the bridge circuit, to short-circuit windings of the motor.

In the inverter device according to a seventh aspect of the embodiments, the second fail-safe circuit according to the sixth aspect outputs driving commands that turn on the upper arm switching elements of all phases when an output voltage of an upper arm isolated power supply circuit supplied with the first power supply is lower than a first threshold value, and outputs driving commands that turn off the upper arm switching elements of all phases when the output voltage of the upper arm isolated power supply circuit is higher than the first threshold value.

In the inverter device according to an eighth aspect of the embodiments, the upper arm driving circuit according to the sixth or seventh aspect prioritizes input of the driving commands output from the second fail-safe circuit to turn on the upper arm switching elements of all phases when an output voltage of an upper arm isolated power supply circuit supplied with the first power supply is lower than a first threshold value, and prioritizes input of the driving commands output from the first fail-safe circuit when the output voltage of the upper arm isolated power supply circuit is higher than the first threshold value to generate the driving signals of the upper arm switching elements.

In the inverter device according to a ninth aspect of the embodiments, the inverter device according to the sixth aspect further includes a voltage detection means for detecting a voltage between the DC bus-bars, wherein the second fail-safe circuit outputs the driving commands that turn off the upper arm switching elements of all phases when a voltage detection value of the voltage detection means is lower than a second threshold value, and outputs the driving commands that turn on the upper arm switching elements of all phases when the voltage detection value of the voltage detection means is higher than the second threshold value and an output voltage of an upper arm isolated power supply circuit supplied with the first power supply is lower than a first threshold value.

A motor driving system according to a tenth aspect of the embodiments includes an inverter device according to any one of second through ninth aspects; and a motor driven by an AC output voltage of the inverter device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF THE PREFERRED EMBODIMENTS

Figure 1:
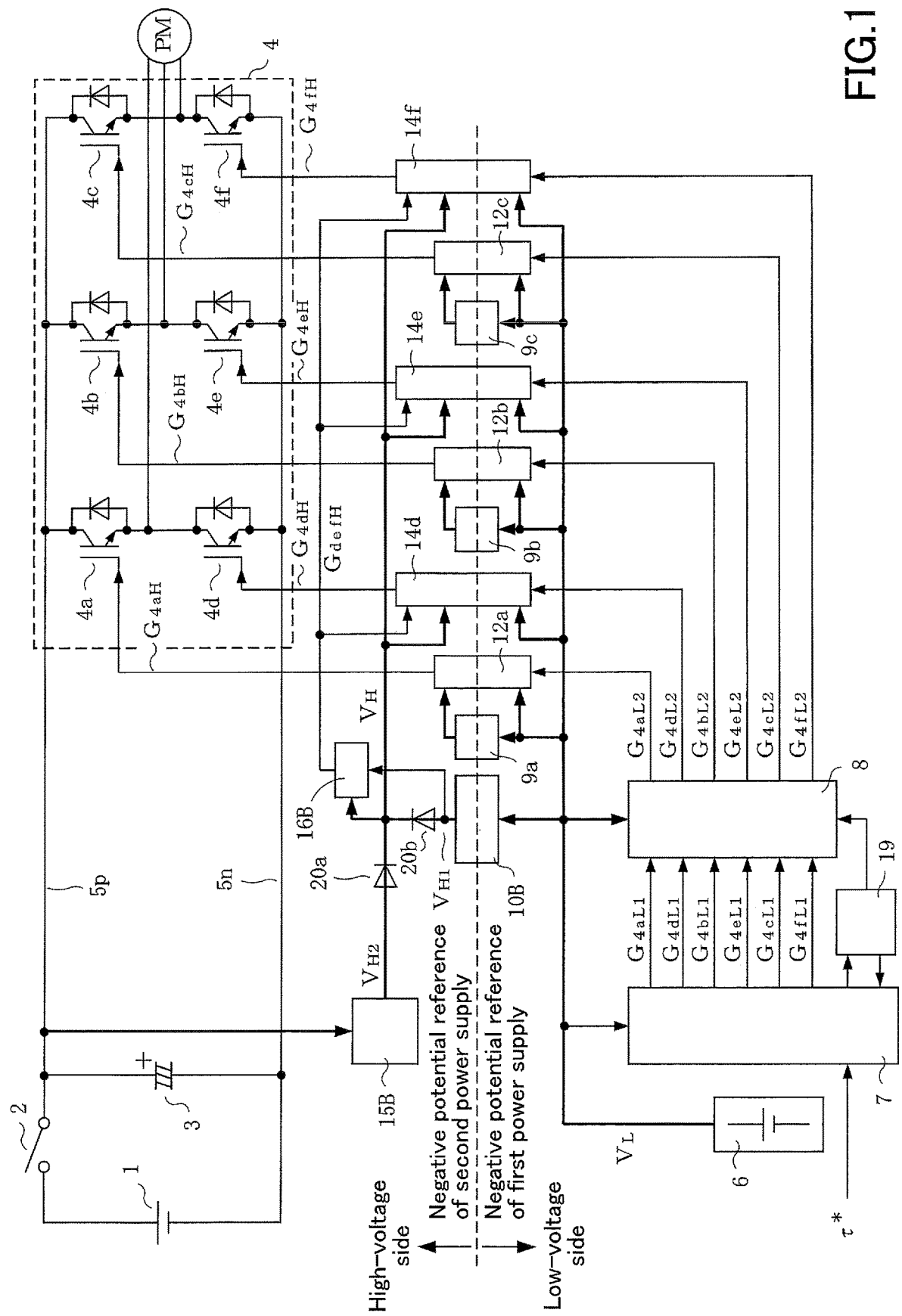
FIG. 1 is a circuit diagram illustrating a first embodiment of the present invention.

Embodiments of the present invention will be described in the following, by referring to the drawings.

FIG. 1 is a circuit diagram illustrating a first embodiment of the present invention. A main circuit of an inverter device according to this embodiment has a structure similar to that of FIG. 12, including a high-voltage main battery 1, a main switch 2, a capacitor 3 (hereinafter also referred to as a second power supply) connected between DC bus-bars 5p and 5b, and a bridge circuit 4 formed by semiconductor switching elements 4a, 4b, 4c, 4d, 4e, and 4f, and a three-phase motor PM is connected to AC output terminals of the bridge circuit 4.

A control circuit that generates gate signals of the switching elements 4a through 4f has the following structure. The above-mentioned "gate signal" corresponds to a "driving signal" recited in the claims.

First, a power supply voltage $V_L$, that is a low voltage output from the first power supply 6, is supplied to a CPU 7 for motor control and a first fail-safe circuit 8. The CPU 7 for motor control generates each of driving commands $G_{4aL1}$, $G_{4dL1}$, $G_{4bL1}$, $G_{4eL1}$, $G_{4cL1}$, and $G_{4fL1}$ for the switching elements 4a, 4b, 4c, 4d, 4e, and 4f so as to operate the motor PM according to a torque command $\tau^*$, and outputs the generated driving commands to the first fail-safe circuit 8. The fail-safe circuit 8 generates gate driving commands $G_{4aL2}$, $G_{4dL2}$, $G_{4bL2}$, $G_{4eL2}$, $G_{4cL2}$, and $G_{4fL2}$ according to the driving commands $G_{4aL1}$, $G_{4dL1}$, $G_{4bL1}$, $G_{4eL1}$, $G_{4cL1}$, and $G_{4fL1}$, and these generated gate driving commands are input to gate driving circuits 12a, 14d, 12b, 14e, 12c, and 14f, respectively.

In addition, the power supply voltage $V_L$ is input to isolated power supply circuits 9a, 9b, and 9c for an upper arm, the gate driving circuits 12a, 12b, and 12c for the upper arm, and an isolated power supply circuit 10B for a lower arm.

A failure detection circuit 19 detects a failure of the CPU 7 for motor control, and notifies the detected failure to the first fail-safe circuit 8.

On the other hand, a voltage of the second power supply 3 is converted into a voltage $V_{H2}$ by a non-isolated power supply circuit 15B for the lower arm. This voltage $V_{H2}$ and a voltage $V_{H1}$ output from the above-mentioned isolated power supply circuit 10B for the lower arm are passed through diodes 20a and 20b, respectively, and input as a power supply voltage $V_H$, having an anode potential of the second power supply 3 as a reference potential thereof, to the gate driving circuits 14d, 14e, and 14f for the lower arm.

Further, the power supply voltage $V_H$ is supplied to a second fail-safe circuit 16B, and a gate driving command $G_{defH}$ output from this fail-safe circuit 16B is input to the gate driving circuits 14d, 14e, and 14f for the lower arm.

Accordingly, the gate driving circuit 14d for the lower arm, for example, generates a gate signal $G_{4dH}$ with respect to the switching element 4d based on the gate driving commands $G_{4dL2}$ and $G_{defH}$ having different reference potentials. The gate driving circuits 14e and 14f of other phases for the lower arm operate similar to the above.

As described above, in this embodiment, the power supply to the gate driving circuits 14d, 14e, and 14f for the lower arm is provided using a redundant structure by the first power supply 6 and the non-isolated power supply circuit 15B, while the power supply to the gate driving circuits 12a, 12b, and 12c for the upper arm is provided solely by the first power supply 6 without using a redundant structure.

For this reason, when the loss of the first power supply 6 occurs, for example, and the windings of the motor PM need to be short-circuited, all of the switching elements 4a, 4b, and 4c of the upper arm cannot be turned on by operating the fail-safe circuit 8 and the gate driving circuits 12a, 12b, and 12c to generate gate signals $G4_{aH}$, $G_{4bH}$, and $G_{4cH}$. However, because the gate driving circuits 14d, 14e, and 14f for the lower arm and the second fail-safe circuit 16B, provided with the power supply from the second power supply 3 and the non-isolated power supply circuit 15B, are operable, the gate driving circuits 14d, 14e, and 14f can turn on all of the switching elements 4d, 4e, and 4f of the lower arm, based on the gate driving command $G_{defH}$ from the fail-safe circuit 16B, to short-circuit the windings of the motor PM.

Figure 12:
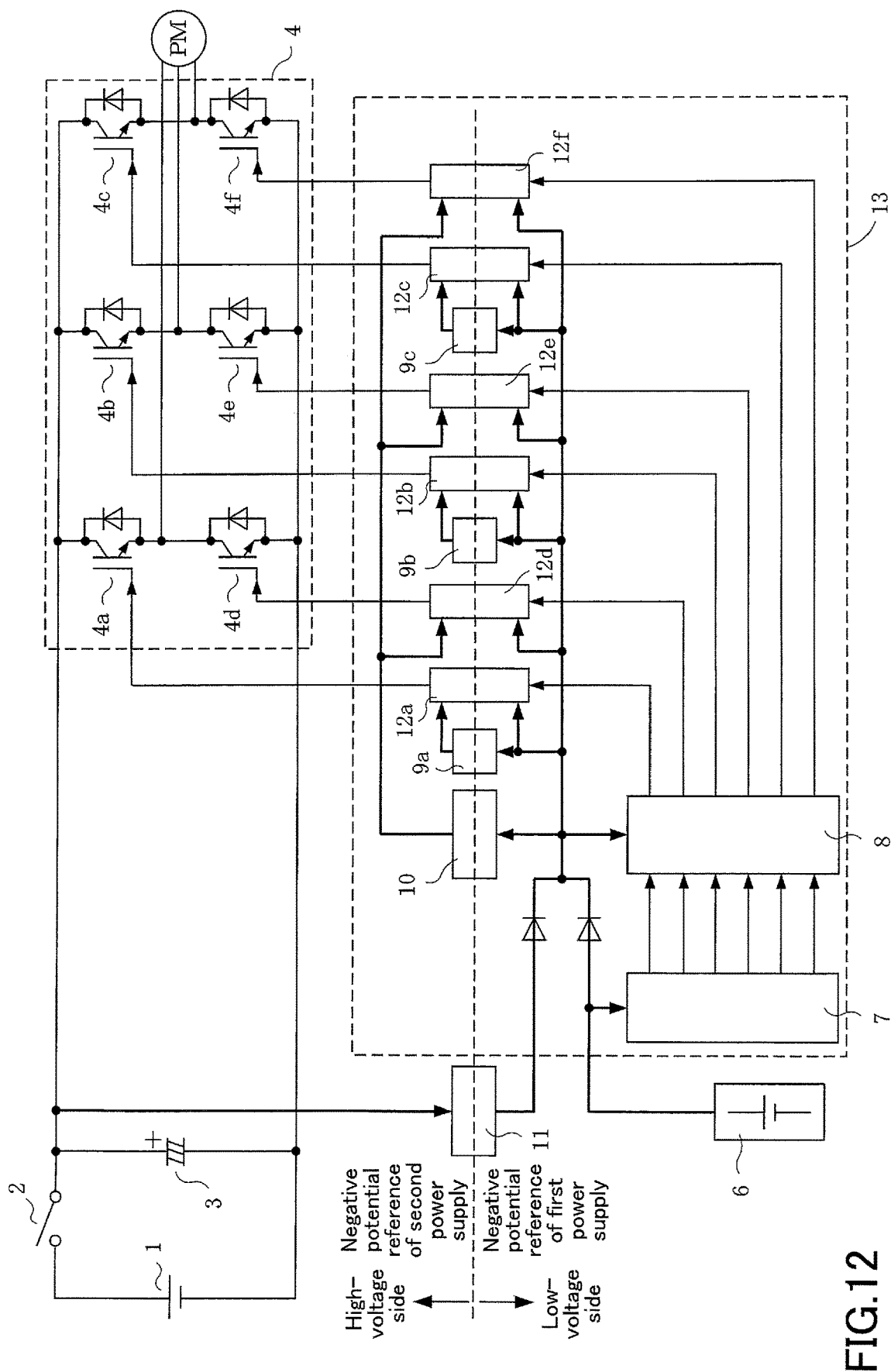
FIG. 12 is a circuit diagram of a motor driving system provided with a power supply having a redundant structure, and an inverter device.

According to this embodiment, destinations of the power supply provided by the non-isolated power supply circuit 15B are the gate driving circuits 14d, 14e, and 14f and the fail-safe circuit 16B, which amount to a considerably small number compared to the number of destinations of the isolated power supply circuit 11 of FIG. 12, and thus, it is possible to reduce the capacity of the non-isolated power supply circuit 15B, reduce the size and weight of the device by making it unnecessary to provide an isolation transformer, and reduce the cost.

Figure 2:
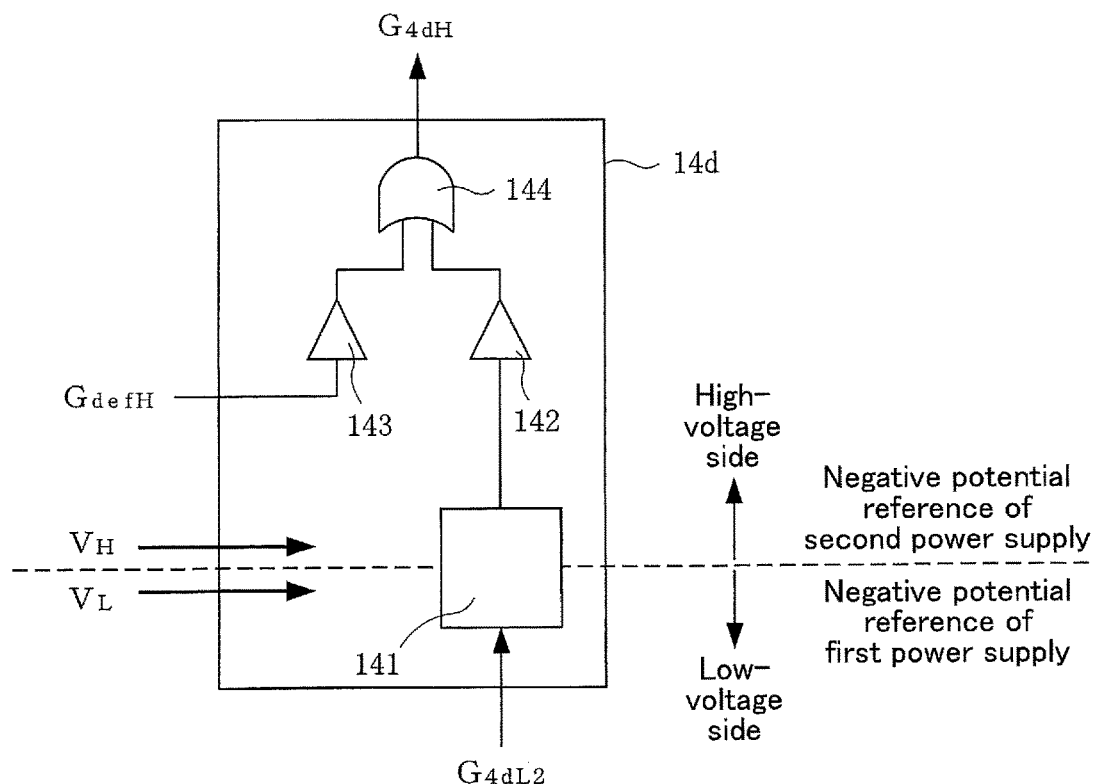
FIG. 2 is a diagram of a structure of a gate driving circuit 14d for a lower arm in FIG. 1.

FIG. 2 is a diagram of a structure of the gate driving circuit 14d with respect to the switching element 4d of the lower arm. The power supply voltages $V_L$ and $V_H$ from the redundant structure are supplied to this gate driving circuit 14d, to generate the gate signal $G_{4dH}$ of the switching element 4d based on the two gate driving commands $G_{4dL2}$ and $G_{defH}$ having different reference potentials. The gate driving circuits 14e and 14f of the other phases for the lower arm have structures similar to that of FIG. 2.

The gate driving circuit 14d illustrated in FIG. 2 includes a signal isolation means 141 for isolating and outputting the gate driving command $G_{4dL2}$ from the first fail-safe circuit 8. The gate driving circuit 14d further includes an amplifier 142, an amplifier 143 to which the gate driving command $G_{defH}$ from the second fail-safe circuit 16B is input, and an OR gate 144 to which output signals of the amplifiers 142 and 143 are input and from which the gate signal $G_{4dH}$ with respect to the switching element 4d is generated.

Figure 3:
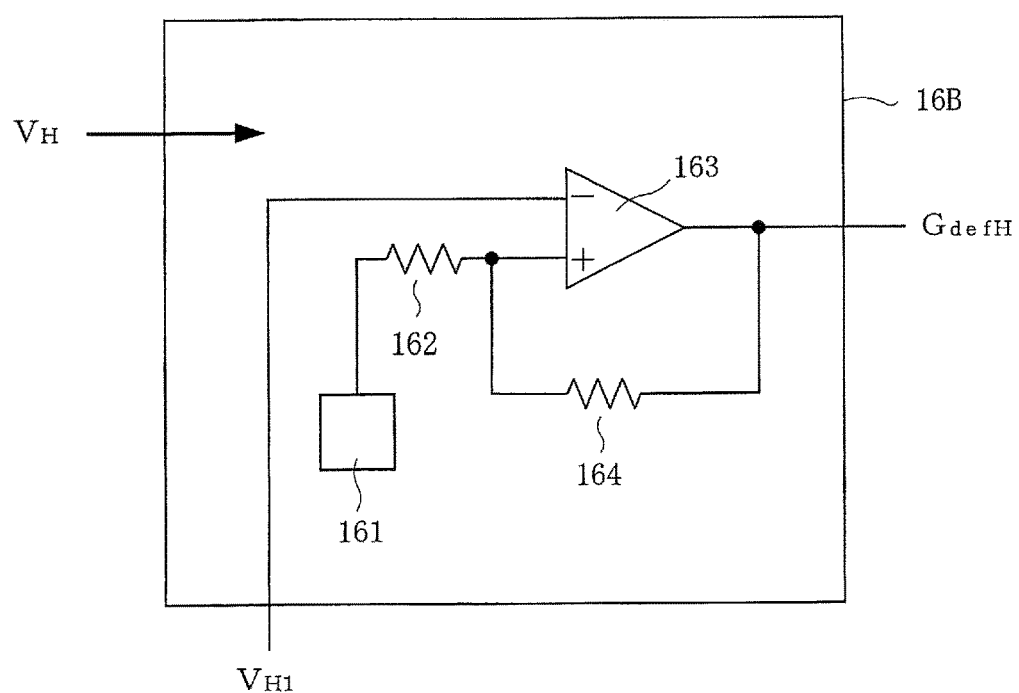
FIG. 3 is a diagram of a structure of a fail-safe circuit 16B in FIG. 1.

FIG. 3 is a diagram of a structure of the second fail-safe circuit 16B supplied with the power supply voltage $V_H$. This fail-safe circuit 16B includes a first comparator 163 having a negative input terminal to which the output voltage $V_{H1}$ of the isolated power supply circuit 10B is input and a positive input terminal to which a first threshold value 161 is input via a resistor 162, and a resistor 164 connected to a feedback circuit of the first comparator 163.

In this fail-safe circuit 16B, when the voltage VH1 becomes lower than the first threshold value 161, the gate driving command $G_{defH}$ with respect to the gate driving circuits 14d, 14e, and 14f for the lower arm is output.

Figure 4:
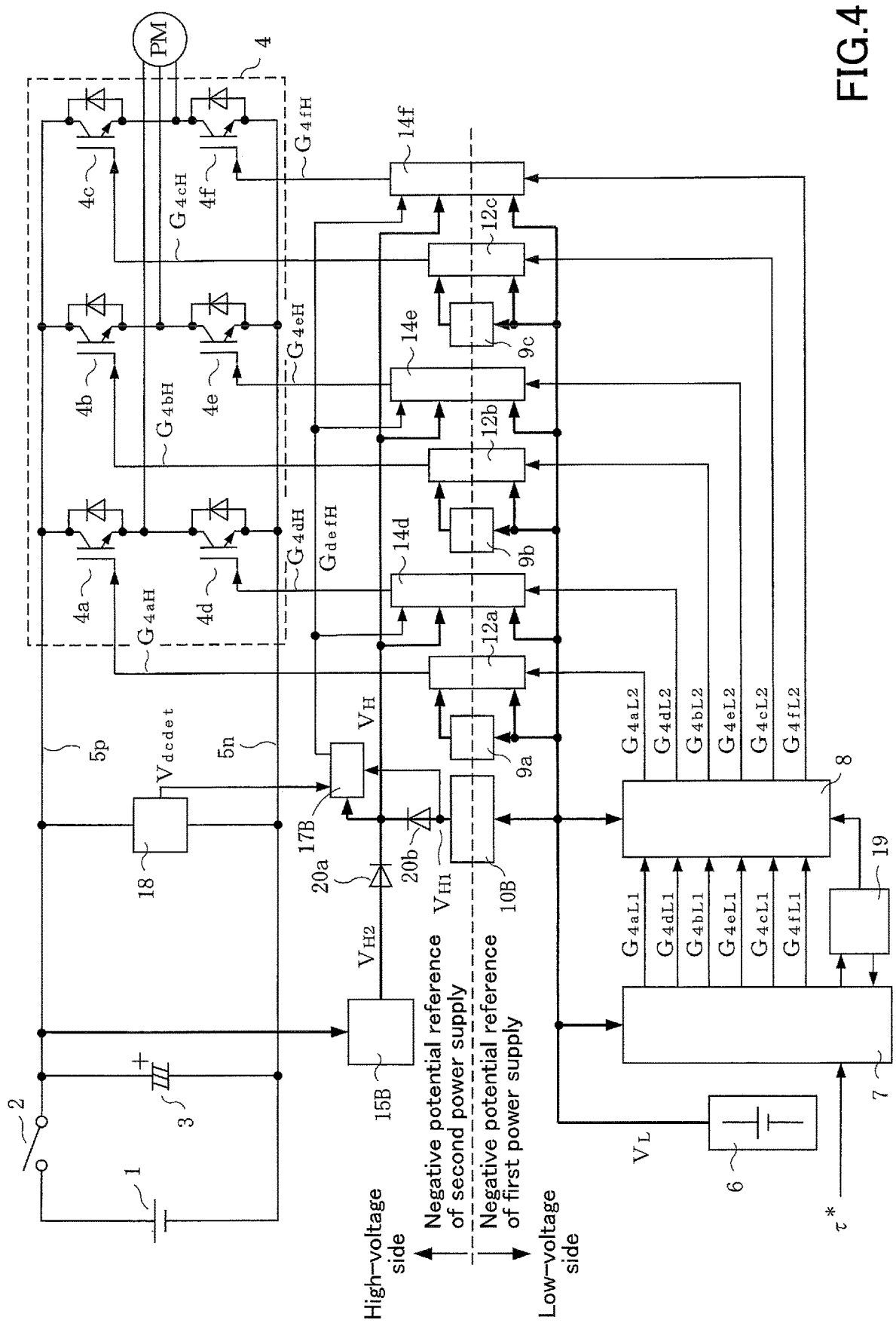
FIG. 4 is a circuit diagram illustrating a second embodiment of the present invention.

Next, FIG. 4 is a circuit diagram illustrating a second embodiment of the present invention. In this second embodiment, those parts that are the same as those corresponding parts of the first embodiment of FIG. 1 are designated by the same reference numerals, a description of the same parts will be omitted, and a description will mainly be made on parts that differ from the first embodiment.

In FIG. 4, a voltage detection means 18 is connected between the DC bus-bars 5p and 5n, and a detection value $V_{dcdet}$ of the DC voltage detected by this voltage detection means 18 is input to a fail-safe circuit 17B. Similar to the fail-safe circuit 16B of FIG. 1, this fail-safe circuit 17B also corresponds to a second fail safe circuit recited in the claims.

The power supply voltage $V_H$ is supplied to the fail-safe circuit 17B, and the fail-safe circuit 17B generates the gate driving command $G_{defH}$ with respect to the gate driving circuits 14d, 14e, and 14f for the lower arm, based on the above-mentioned DC voltage detection value $V_{dcdet}$ and the output voltage $V_{H1}$ of the isolated power supply circuit 10B.

Figure 5:
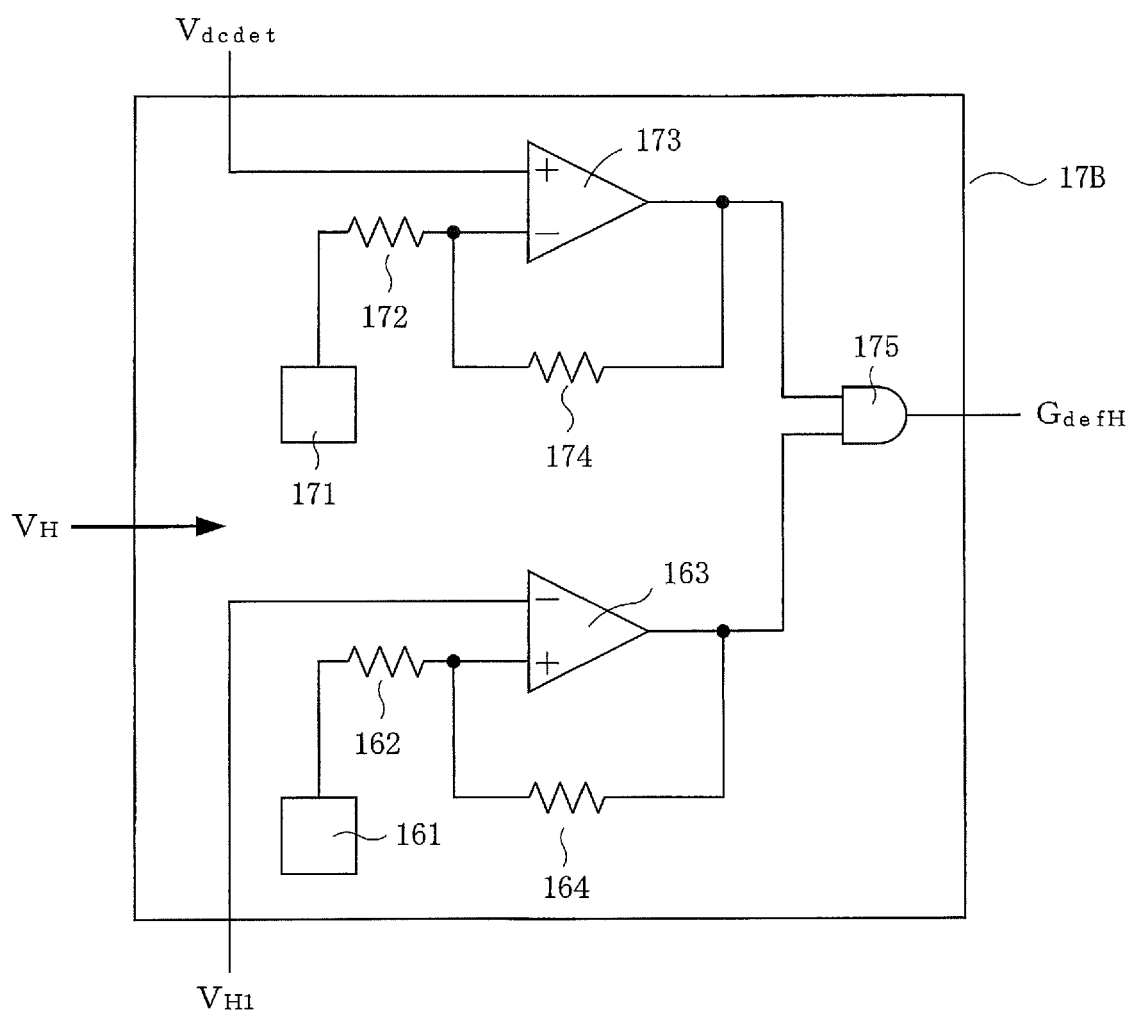
FIG. 5 is a diagram of a structure of a fail-safe circuit 17B in FIG. 4.

FIG. 5 is a diagram of a structure of the fail-safe circuit 17B, and those parts that are the same as the parts of the fail-safe circuit 16B of FIG. 3 are designated by the same reference numerals, and a description will mainly be made on parts that differ therefrom.

In the fail-safe circuit 17B illustrated in FIG. 5, the DC voltage detection value $V_{dcdet}$ from the voltage detection means 18 is input to a positive input terminal of a second comparator 173, and a second threshold value 171 is input to a negative input terminal of the second comparator 173 via a resistor 172. The fail-safe circuit 17B further includes a resistor 174 of a feedback circuit of the second comparator 173.

An output of the second comparator 173 is input to an AND gate 175, together with an output of the first comparator 163, and an output of this AND gate 175 becomes the gate driving command $G_{defH}$.

In the fail-safe circuit 17B, when the DC voltage detection value $V_{dcdet}$ is higher than the second threshold value 171 and the voltage $V_{H1}$ is lower than the first threshold value 161, the level of the two input signals of the AND gate 175 becomes "high", and the gate driving command $G_{defH}$ becomes on.

For this reason, all of the switching elements 4d, 4e, and 4f of the lower arm are turned on by the gate signals $G_{4dH}$, $G_{4eH}$, and $G_{4fH}$ from the gate driving circuits 14d, 14e, and 14f, to short-circuit the windings of the motor PM. In addition, when the DC voltage detection value $V_{dcdet}$ is lower than the second threshold value 171, the level of the output signal of the comparator 173 becomes "low", the gate driving command $G_{defH}$ becomes off regardless of the size relationship between the voltage $V_{H1}$ and the first threshold value 161, and all of the switching elements 4d, 4e, and 4f of the lower arm are turned off.

Figure 6:
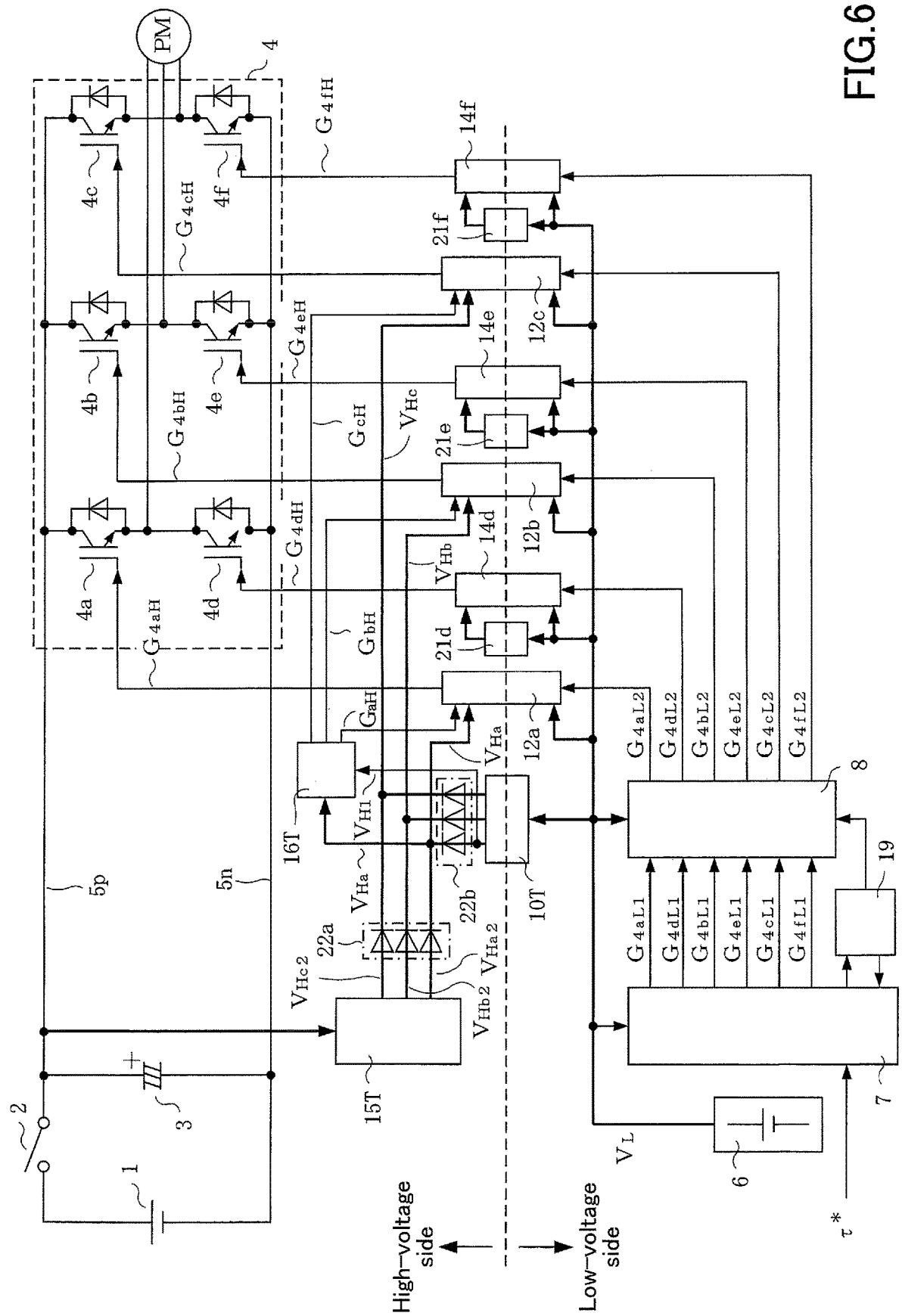
FIG. 6 is a circuit diagram illustrating a third embodiment of the present invention.

Next, FIG. 6 is a circuit diagram illustrating a third embodiment of the present invention.

In the above-mentioned first and second embodiments, the power supply to the gate driving circuits 14d, 14e, and 14f for driving the switching elements 4d, 4e, and 4f of the lower arm, and to the fail-safe circuits 16B and 17B, is provided using the redundant structure, so that the switching elements of all phases of the lower arm can be turned on to enable the windings of the motor PM to be short-circuited, even when the loss of the first power supply 6 occurs.

On the other hand, in the third embodiment and a fourth embodiment which will be described later, the power supply to the gate driving circuits 12a, 12b, and 12c for driving the switching elements 4a, 4b, and 4c of the upper arm, and the like is provided using the redundant structure, so that the switching elements of all phases of the upper arm can be turned on to enable the motor windings to be short-circuited, even when the loss of the first power supply 6 occurs.

In FIG. 6, 10T is an isolated power supply circuit for the upper arm, supplied with the first power supply 6, and the isolated power supply circuit 10T outputs power supply voltages respectively corresponding to the gate driving circuits 12a, 12b, and 12c via a diode 22b. In addition, 15T is an isolated power supply circuit for the upper arm, supplied with the second power supply 3, and the isolated power supply circuit 15T generates power supply voltages $V_{Ha2}$, $V_{Hb2}$, and $V_{Hc2}$ respectively corresponding to the gate driving circuits 12a, 12b, and 12c. These power supply voltages become power supply voltages $V_{Ha}$, $V_{Hb}$, and $V_{Hc}$ via the diodes 22a and 22b.

Further, the power supply voltage $V_{Ha}$ is input to a fail-safe circuit 16T, and the voltage $V_{H1}$ from the isolated power supply circuit 10T is also input to the fail-safe circuit 16T.

Similar to the above-mentioned fail-safe circuits 16B and 17B, this fail-safe circuit 16T also corresponds to the second fail-safe circuit recited in the claims.

The fail-safe circuit 16T generates gate driving commands $G_{aH}$, $G_{bH}$, and $G_{cH}$, and these gate driving commands $G_{aH}$, $G_{bH}$, and $G_{cH}$ are respectively input to the gate driving circuits 12a, 12b, and 12c for the upper arm. In addition, because the power supply voltage $V_L$ of the first power supply 6 is also input to the gate driving circuits 12a, 12b, and 12c, the power supply to the gate driving circuits 12a, 12b, and 12c is provided using the redundant structure.

Accordingly, the gate driving circuit 12a with respect to the switching element 4a of the upper arm, for example, generates the gate signal $G_{4aH}$ with respect to the switching element 4a based on the gate driving commands $G_{4aL2}$ and $G_{aH}$ having different reference potentials, and the gate driving circuits 12b and 12c of other phases for the upper arm operate similar to the above.

Figure 7:
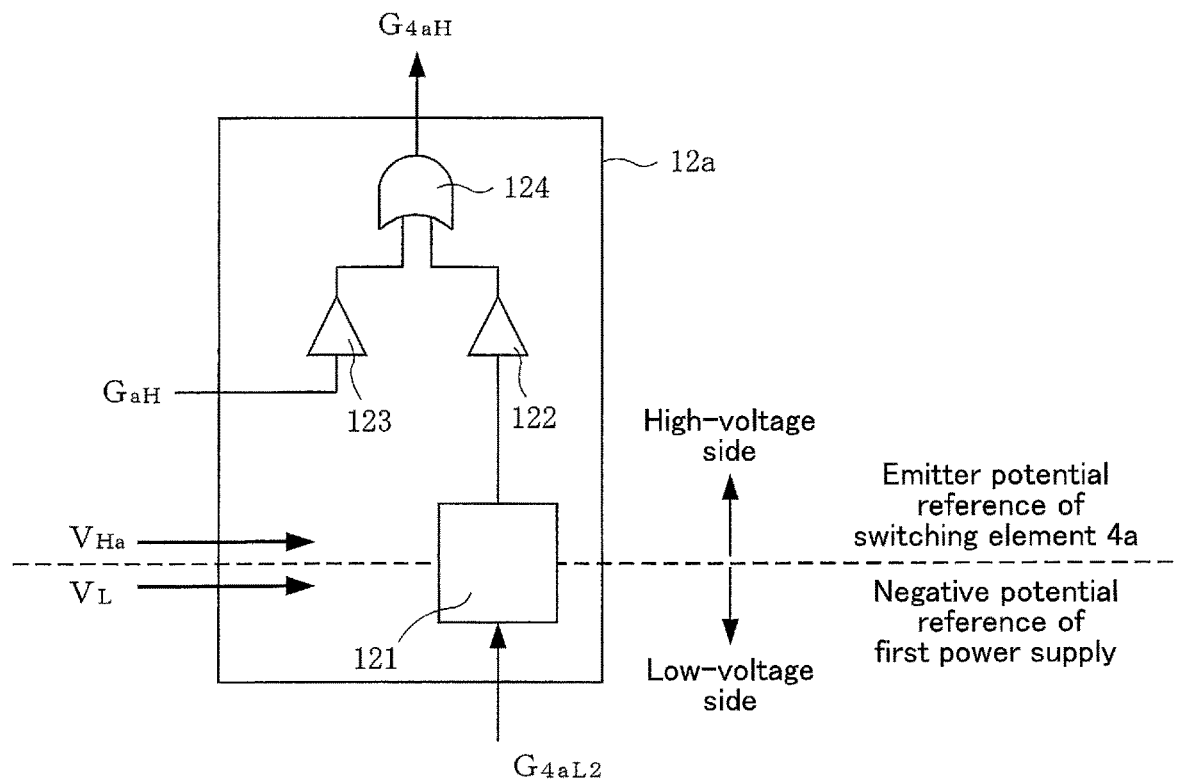
FIG. 7 is a diagram of a structure of a gate driving circuit 12a for an upper arm in FIG. 6.

FIG. 7 is a diagram of a structure of the gate driving circuit 12a in FIG. 6. The power supply voltages $V_L$ and $V_{Ha}$ to this gate driving circuit 12a are provided using the redundant structure, and the gate signal G4aH of the switching element 4a is generated based on the two gate driving commands $G_{4aL2}$ and $G_{aH}$ having different reference potentials.

The gate driving circuit 12a illustrated in FIG. 7 includes a signal isolation means 121 for isolating and outputting the gate driving command $G_{4aL2}$ from the first fail-safe circuit 8, an amplifier 122, an amplifier 123 to which the gate driving command $G_{aH}$ from the fail-safe circuit 16T is input, and an OR gate 124 that is input with output signals of the amplifiers 122 and 123 and generates the gate signal $G_{4aH}$ with respect to the switching element 4a.

Figure 8:
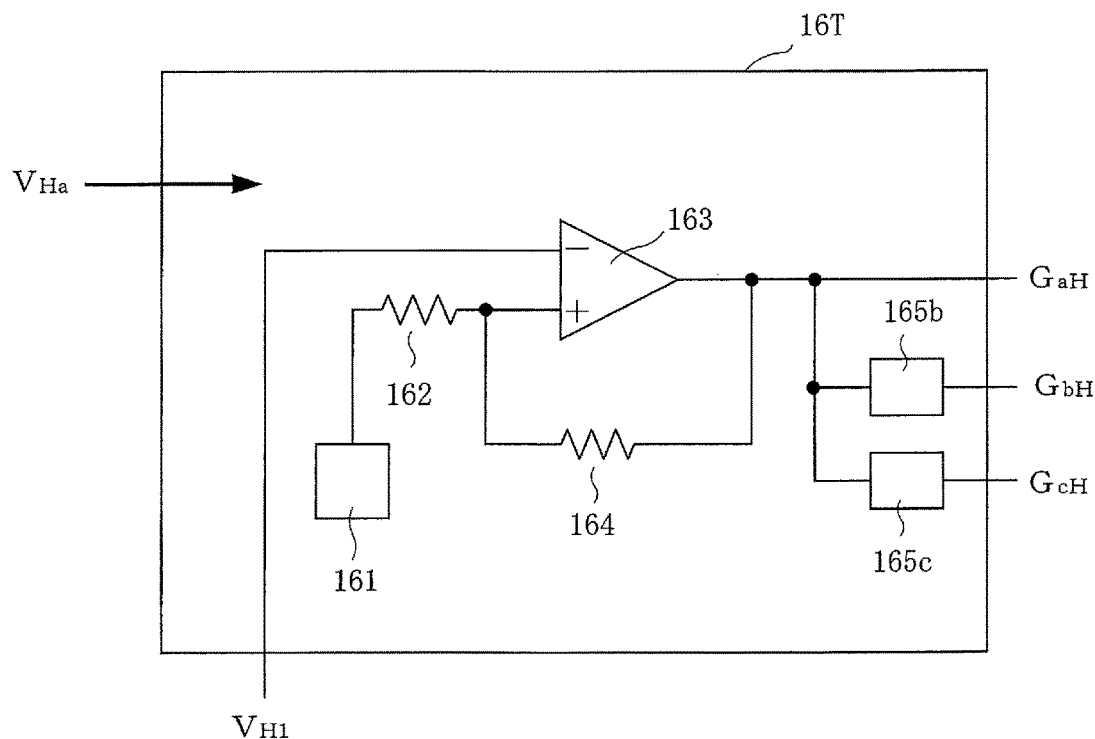
FIG. 8 is a diagram of a structure of a fail-safe circuit 16T in FIG. 6.

In addition, FIG. 8 is a diagram of a structure of the fail-safe circuit 16T supplied with the power supply voltage $V_{Ha}$. This fail-safe circuit 16T includes the first comparator 163 having the negative input terminal to which the output voltage VH1 of the isolated power supply circuit 10T is input and the positive input terminal to which the first threshold value 161 is input via the resistor 162, the resistor 164 connected to the feedback circuit of the comparator 163, and signal isolation means 165b and 165c connected to an output side of the comparator 163.

In this fail-safe circuit 16T, when the voltage VH1 is lower than the first threshold value 161, the output of the comparator 163 becomes "high", and the gate driving commands $G_{aH}$, $G_{bH}$, and $G_{cH}$ with respect to the switching elements 4a, 4b, and 4c of the upper arm are generated and input to the gate driving circuits 12a, 12b, and 12c, respectively.

In this third embodiment, the power supply to the gate driving circuits 12a, 12b, and 12c for the upper arm is provided using the redundant structure by the first power supply 6 and the isolated power supply circuit 15T, while the power supply to the gate driving circuits 14d, 14e, and 14f for the lower arm is provided solely by the first power supply 6.

For this reason, when the loss of the first power supply 6 occurs, for example, and the windings of the motor PM need to be short-circuited, all of the switching elements 4d, 4e, and 4f of the lower arm cannot be turned on by operating the fail-safe circuit 8 and the gate driving circuits 14d, 14e, and 14f to generate the gate signals $G_{4dH}$, $G_{4eH}$, and $G_{4fH}$. However, because the gate driving circuits 12a, 12b, and 12c for the upper arm and the fail-safe circuit 16T, provided with the power supply from the second power supply 3 and the isolated power supply circuit 15T, are operable, the gate driving circuits 12a, 12b, and 12c can turn on all of the switching elements 4a, 4b, and 4c of the upper arm, based on the gate driving commands $G_{aH}$, $G_{bH}$, and $G_{cH}$ from the fail-safe circuit 16T, to short-circuit the windings of the motor PM.

According to this embodiment, destinations of the power supply provided by the isolated power supply circuit 15T are the gate driving circuits 12a, 12b, and 12c and the fail-safe circuit 16T, which amount to a considerably small number compared to the number of destinations of the isolated power supply circuit 11 of FIG. 12, and thus, it is possible to reduce the capacity of the isolated power supply circuit 15T, to reduce the size and weight of the device, and to reduce the cost.

Figure 9:
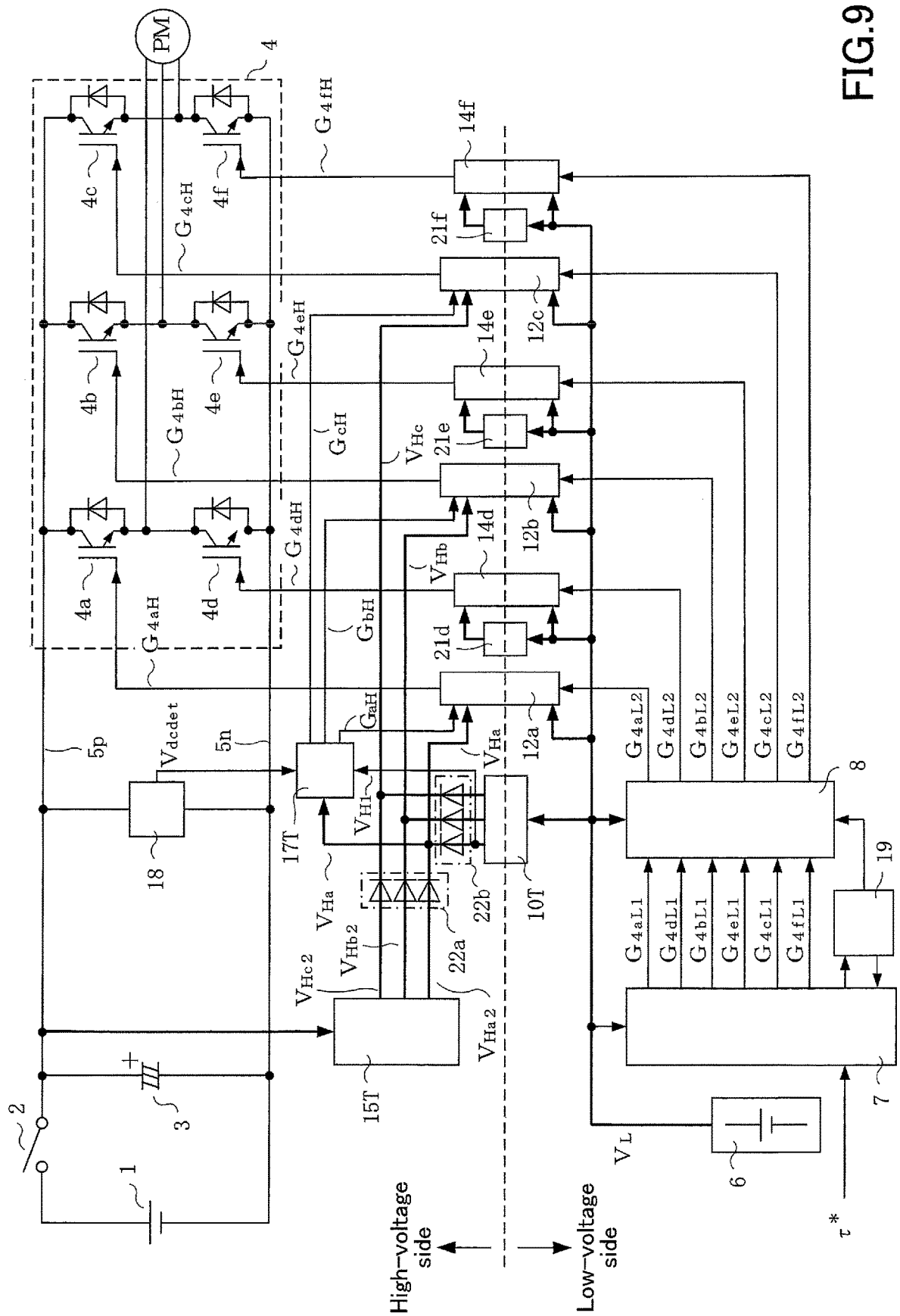
FIG. 9 is a circuit diagram illustrating a fourth embodiment of the present invention.

Next, FIG. 9 is a circuit diagram illustrating a fourth embodiment of the present invention. This fourth embodiment differs from the third embodiment of FIG. 6, in that a fail-safe circuit 17T is provided in place of the fail-safe circuit 16T of FIG. 6, and that the DC voltage detection value $V_{dcdet}$ from the voltage detection means 18 is input to the fail-safe circuit 17T.

Similar to the above-mentioned fail-safe circuits 16B, 17B, and 16T, this fail-safe circuit 17T also corresponds to the second fail safe circuit recited in the claims.

Figure 10:
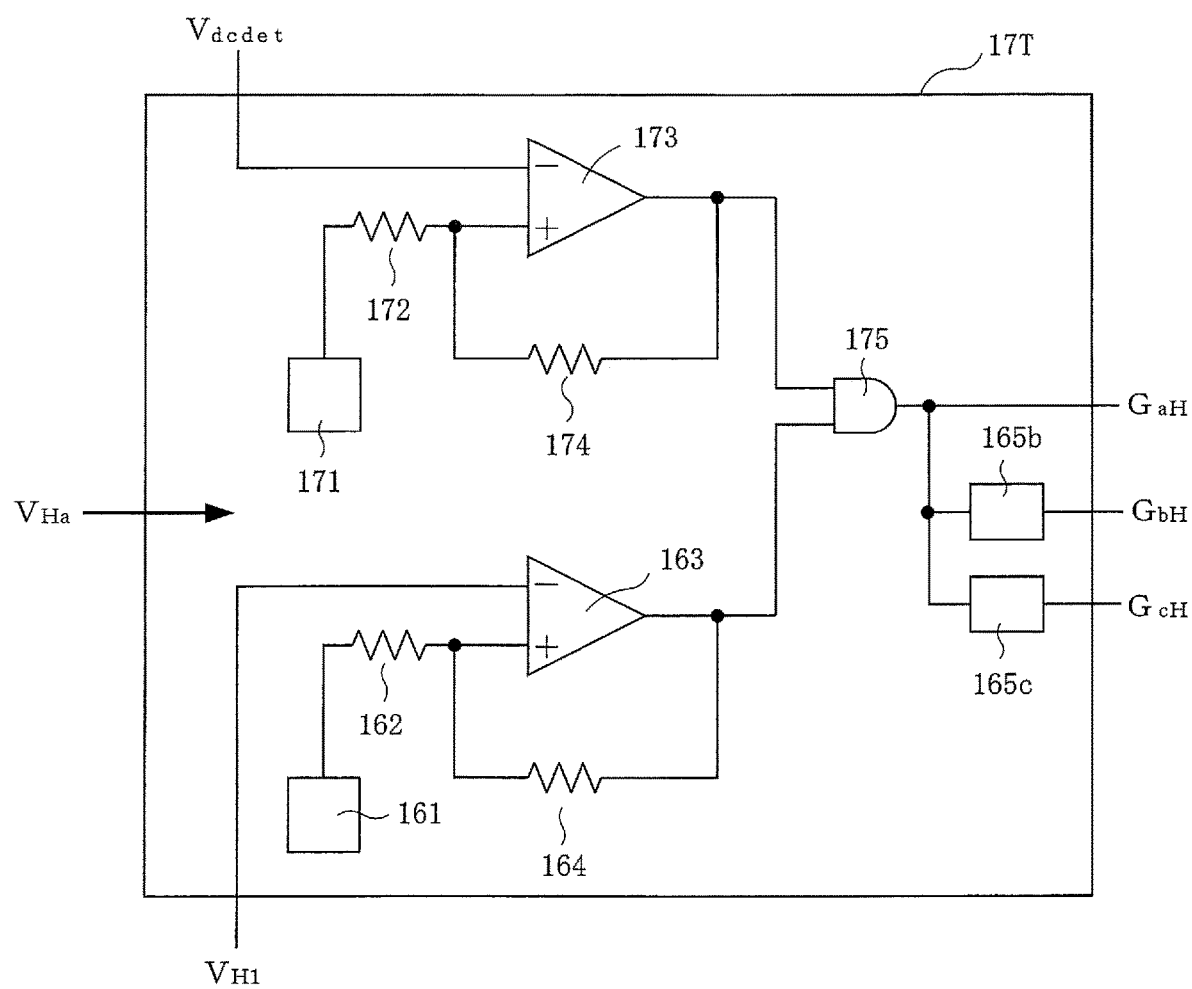
FIG. 10 is a diagram of a structure of a fail-safe circuit 17T in FIG. 9.
Figure 11:
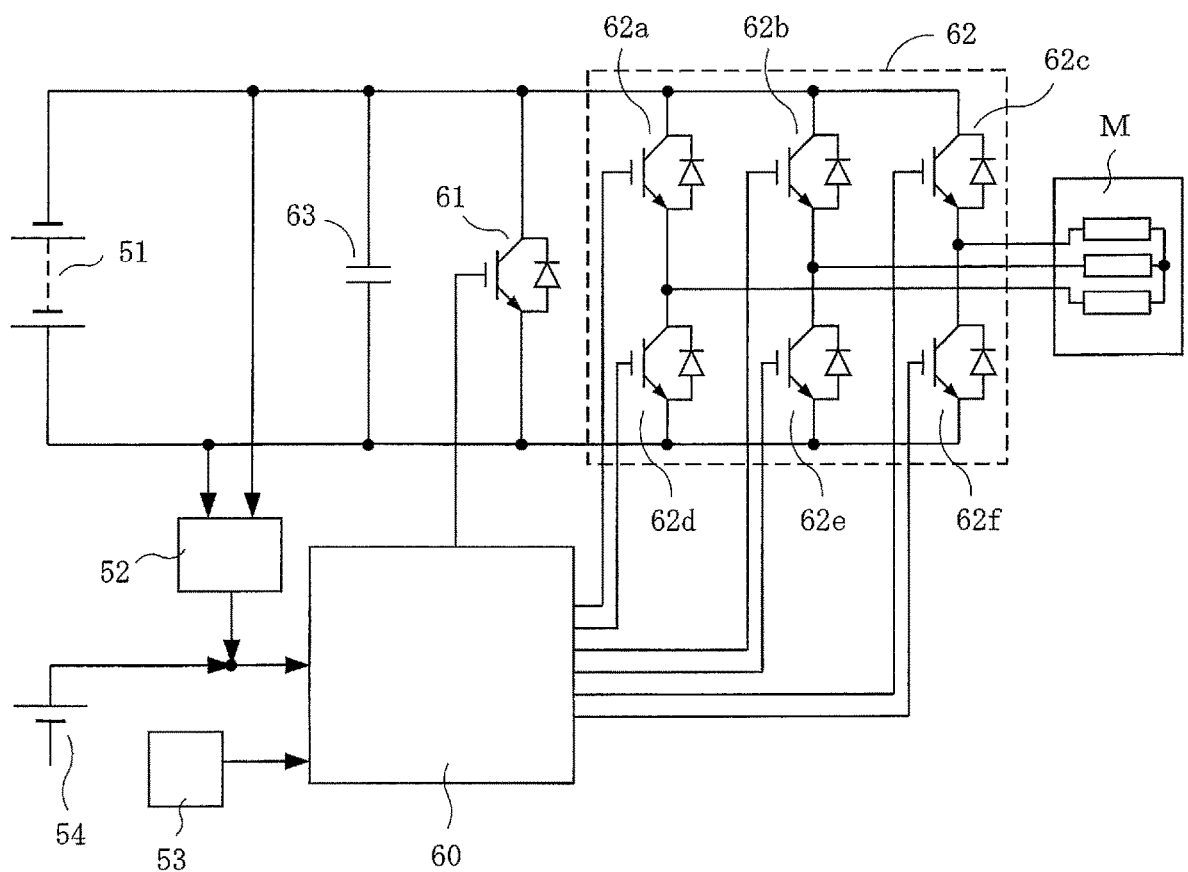
FIG. 11 is a circuit diagram of a motor driving system described in Japanese Laid-Open Patent Publication No. 2000-14184.

FIG. 10 is a diagram of a structure of the fail-safe circuit 17T. The fail-safe circuit 17T differs from the fail-safe circuit 17B of FIG. 5, in that signal isolation means 165b and 165c are connected to the output side of the AND gate 175, to output the gate driving commands $G_{aH}$, $G_{bH}$, and $G_{cH}$ with respect to the upper arm.

In the fail-safe circuit 17T, when the DC voltage detection value $V_{dcdet}$ is higher than the second threshold value 171 and the voltage $V_{H1}$ is lower than the first threshold value 161, the level of the two input signals to the AND gate 175 becomes "high", to turn on the gate driving commands $G_{aH}$, $G_{bH}$, and $G_{cH}$.

For this reason, all of the switching elements 4a, 4b, and 4c of the upper arm are turned on by the gate signals $G_{4aH}$, $G_{4bH}$, and $G_{4cH}$ from the gate driving circuits 12a, 12b, and 12c, to short-circuit the windings of the motor PM. In addition, when the DC voltage detection value $V_{dcdet}$ is lower than the second threshold value 171, the level of the output signal of the comparator 173 becomes "low", and thus, the gate signals $G_{4aH}$, $G_{4bH}$, and $G_{4cH}$ turn off regardless of the size relationship between the voltage $V_{H1}$ and the first threshold value 161, to turn off all of the switching elements 4a, 4b, and 4c of the upper arm.

As described above, according to the third embodiment of FIG. 6 or the fourth embodiment of FIG. 9, the power supply to the gate driving circuits 12a, 12b, and 12c for driving the switching elements 4a, 4b, and 4c of the upper arm, and to the fail-safe circuits 16T and 17T and the like, is provided using the redundant structure, so that the switching elements 4a, 4b, and 4c of all phases of the upper arm can be turned on to enable the motor windings to be short-circuited, even when the loss of the first power supply 6 occurs.

In each of the above-mentioned embodiments, the three-phase inverter device is described, however, the disclosed inverter device is applicable to a single-phase inverter device and multi-phase inverter devices other than the three-phase inverter device. In addition, the switching elements of the inverter may use transistors other than IGBTs (Insulated Gate Bipolar Transistors), such as FETs (Field Effect Transistors), power transistors, or the like.

The disclosed inverter device is not only applicable to motors for electrical vehicles, and is applicable to an inverter device and a motor driving system that drive an AC motor by a control circuit having a redundant power supply structure.

Unlike the conventional technique that provides the power supply to the driving circuits of the upper arm switching elements and the lower arm switching elements using the redundant structure, according to the disclosed inverter device, the power supply with respect to only one of the arms needs to be provided using the redundant structure, for the purposes of securing the fail-safe function. For this reason, the disclosed inverter device can reduce the capacity of the power supply generation means, to reduce the overall size of the device, and to reduce the cost.

In addition, because the insulation function is not required when providing the power supply to the driving circuits of the switching elements using the non-isolated power supply circuit, according to the disclosed inverter device, it is possible to further reduce the size of the device, and further reduce the cost.

Although the embodiments are numbered with, for example, "first," "second," "third," or "fourth," the ordinal numbers do not imply priorities of the embodiments. Many other variations and modifications will be apparent to those skilled in the art.

Further, the present invention is not limited to these embodiments, but various variations, modifications, and substitutions may be made without departing from the scope of the present invention.

What is claimed is:

1. A control circuit for an inverter device that is configured to drive a motor by performing an AC-DC conversion by a bridge circuit including a plurality of switching elements coupled between DC bus-bars, the control circuit comprising:
    an upper arm driving circuit configured to generate driving signals of upper arm switching elements among the plurality of switching elements included in the bridge circuit;
    a lower arm driving circuit configured to generate driving signals of lower arm switching elements among the plurality of switching elements included in the bridge circuit;
    a first power supply configured to supply a power supply voltage to the upper arm driving circuit and the lower arm driving circuit;
    a second power supply, having a reference potential different from that of the first power supply, and configured to supply a power supply voltage from the DC bus-bars to the upper arm driving circuit or the lower arm driving circuit;
    a first fail-safe circuit, having a reference potential common to that of the first power supply, and configured to generate driving commands with respect to the upper arm driving circuit and the lower arm driving circuit; and
    a second fail-safe circuit, having a reference potential common to that of the second power supply, and configured to generate driving commands with respect to the upper arm driving circuit or the lower arm driving circuit,
    wherein the upper arm driving circuit or the lower arm driving circuit has two driving command input functions having different reference potentials,
    wherein one of the two driving command input functions is an input function to input the driving commands output from the first fail-safe circuit, and the other of the two driving command input functions is an input function to input the driving commands output from the second fail-safe circuit, and
    wherein the first fail-safe circuit and the second fail-safe circuit provide a fail-safe function that turns on the upper arm switching elements of all phases or the lower arm switching elements of all phases in the bridge circuit, to short-circuit windings of the motor.

2. An inverter device for driving a motor by performing an AC-DC conversion by a bridge circuit including a plurality of switching elements coupled between DC bus-bars, the inverter device comprising:
    an upper arm driving circuit configured to generate driving signals of upper arm switching elements among the plurality of switching elements included in the bridge circuit;
    a lower arm driving circuit configured to generate driving signals of lower arm switching elements among the plurality of switching elements included in the bridge circuit;
    a first power supply configured to supply a power supply voltage to the upper arm driving circuit and the lower arm driving circuit;
    a second power supply, having a reference potential different from that of the first power supply, and configured to supply a power supply voltage from the DC bus-bars to the lower arm driving circuit;
    a first fail-safe circuit, having an anode potential of the first power supply as a reference potential, and configured to generate driving commands with respect to the upper arm driving circuit and the lower arm driving circuit; and
    a second fail-safe circuit, having an anode potential of the second power supply as a reference potential, and configured to generate driving commands with respect to the lower arm driving circuit,
    wherein the lower arm driving circuit has two driving command input functions having different reference potentials,
    wherein one of the two driving command input functions is an input function to input the driving commands output from the first fail-safe circuit, and the other of the two driving command input functions is an input function to input the driving commands output from the second fail-safe circuit, and
    wherein the first fail-safe circuit and the second fail-safe circuit provide a fail-safe function that turns on the upper arm switching elements of all phases or the lower arm switching elements of all phases in the bridge circuit, to short-circuit windings of the motor.

3. The inverter device as claimed in claim 2, wherein the second fail-safe circuit outputs driving commands that turn on the lower arm switching elements of all phases when an output voltage of a lower arm isolated power supply circuit supplied with the first power supply is lower than a first threshold value, and outputs driving commands that turn off the lower arm switching elements of all phases when the output voltage of the lower arm isolated power supply circuit is higher than the first threshold value.

4. The inverter device as claimed in claim 3, wherein the lower arm driving circuit prioritizes input of the driving commands output from the second fail-safe circuit to turn on the lower arm switching elements of all phases when an output voltage of a lower arm isolated power supply circuit supplied with the first power supply is lower than a first threshold value, and prioritizes input of the driving commands output from the first fail-safe circuit when the output voltage of the lower arm isolated power supply circuit is higher than the first threshold value to generate the driving signals of the lower arm switching elements.

5. The inverter device as claimed in claim 2, wherein the lower arm driving circuit prioritizes input of the driving commands output from the second fail-safe circuit to turn on the lower arm switching elements of all phases when an output voltage of a lower arm isolated power supply circuit supplied with the first power supply is lower than a first threshold value, and prioritizes input of the driving commands output from the first fail-safe circuit when the output voltage of the lower arm isolated power supply circuit is higher than the first threshold value to generate the driving signals of the lower arm switching elements.

6. The inverter device as claimed in claim 2, further comprising:
a voltage detection means for detecting a voltage between the DC bus-bars,
wherein the second fail-safe circuit outputs the driving commands that turn off the lower arm switching elements of all phases when a voltage detection value of the voltage detection means is lower than a second threshold value, and outputs the driving commands that turn on the lower arm switching elements of all phases when the voltage detection value of the voltage detection means is higher than the second threshold value and an output voltage of a lower arm isolated power supply circuit supplied with the first power supply is lower than a first threshold value.

7. A motor driving system comprising:
an inverter device according to claim 2; and
a motor driven by an AC output voltage of the inverter device.

8. An inverter device for driving a motor by performing an AC-DC conversion by a bridge circuit including a plurality of switching elements coupled between DC bus-bars, the inverter device comprising:
an upper arm driving circuit configured to generate driving signals of upper arm switching elements among the plurality of switching elements included in the bridge circuit;
a lower arm driving circuit configured to generate driving signals of lower arm switching elements among the plurality of switching elements included in the bridge circuit;
a first power supply configured to supply a power supply voltage to the upper arm driving circuit and the lower arm driving circuit;
a second power supply, having a reference potential different from that of the first power supply, and configured to supply a power supply voltage from the DC bus-bars to the upper arm driving circuit;
a first fail-safe circuit, having an anode potential of the first power supply as a reference potential, and configured to generate driving commands with respect to the upper arm driving circuit and the lower arm driving circuit; and
a second fail-safe circuit, having a potential of an output terminal of the upper arm switching element of one of the phases as a reference potential, and configured to generate driving commands with respect to the upper arm driving circuit,
wherein the upper arm driving circuit has two driving command input functions having different reference potentials,
wherein one of the two driving command input functions is an input function to input the driving commands output from the first fail-safe circuit, and the other of the two driving command input functions is an input function to input the driving commands output from the second fail-safe circuit, and
wherein the first fail-safe circuit and the second fail-safe circuit provide a fail-safe function that turns on the upper arm switching elements of all phases or the lower arm switching elements of all phases in the bridge circuit, to short-circuit windings of the motor.

9. The inverter device as claimed in claim 8, wherein the second fail-safe circuit outputs driving commands that turn on the upper arm switching elements of all phases when an output voltage of an upper arm isolated power supply circuit supplied with the first power supply is lower than a first threshold value, and outputs driving commands that turn off the upper arm switching elements of all phases when the output voltage of the upper arm isolated power supply circuit is higher than the first threshold value.

10. The inverter device as claimed in claim 9, wherein the upper arm driving circuit prioritizes input of the driving commands output from the second fail-safe circuit to turn on the upper arm switching elements of all phases when an output voltage of an upper arm isolated power supply circuit supplied with the first power supply is lower than a first threshold value, and prioritizes input of the driving commands output from the first fail-safe circuit when the output voltage of the upper arm isolated power supply circuit is higher than the first threshold value to generate the driving signals of the upper arm switching elements.

11. The inverter device as claimed in claim 8, wherein the upper arm driving circuit prioritizes input of the driving commands output from the second fail-safe circuit to turn on the upper arm switching elements of all phases when an output voltage of an upper arm isolated power supply circuit supplied with the first power supply is lower than a first threshold value, and prioritizes input of the driving commands output from the first fail-safe circuit when the output voltage of the upper arm isolated power supply circuit is higher than the first threshold value to generate the driving signals of the upper arm switching elements.

12. The inverter device as claimed in claim 8, further comprising:
a voltage detection means for detecting a voltage between the DC bus-bars,
wherein the second fail-safe circuit outputs the driving commands that turn off the upper arm switching elements of all phases when a voltage detection value of the voltage detection means is lower than a second threshold value, and outputs the driving commands that turn on the upper arm switching elements of all phases when the voltage detection value of the voltage detection means is higher than the second threshold value and an output voltage of an upper arm isolated power supply circuit supplied with the first power supply is lower than a first threshold value.

13. A motor driving system comprising:
an inverter device according to claim 8; and
a motor driven by an AC output voltage of the inverter device.

* * * * *